US010621648B2

(12) United States Patent
Davis

(10) Patent No.: US 10,621,648 B2
(45) Date of Patent: Apr. 14, 2020

(54) SYSTEMS AND METHODS FOR PRODUCT RECOMMENDATION

(71) Applicant: Walmart Apollo, LLC, Bentonville, AR (US)

(72) Inventor: Randall E. Davis, Ridgewood, NJ (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/427,010

(22) Filed: May 30, 2019

(65) Prior Publication Data

US 2019/0370881 A1    Dec. 5, 2019

Related U.S. Application Data

(60) Provisional application No. 62/677,924, filed on May 30, 2018.

(51) Int. Cl.
G06Q 30/00 (2012.01)
G06Q 30/06 (2012.01)

(52) U.S. Cl.
CPC ..... *G06Q 30/0631* (2013.01); *G06Q 30/0613* (2013.01); *G06Q 30/0623* (2013.01); *G06Q 30/0629* (2013.01)

(58) Field of Classification Search
CPC ........... G06Q 30/0601; G06Q 30/0613; G06Q 30/0623; G06Q 30/0629; G06Q 30/0631
See application file for complete search history.

(56) References Cited

U.S. PATENT DOCUMENTS 7,343,328 B1   3/2008 Smith
7,809,601 B2   10/2010 Shaya
(Continued)

FOREIGN PATENT DOCUMENTS

CA    3021014    10/2017

OTHER PUBLICATIONS

Jabr, Wael, and Eric Zheng. "Know yourself and know your enemy: An analysis of firm recommendations and consumer reviews in a competitive environment." Jabr, Wael and Eric Zheng. MIS Quarterly. Accepted Jul. 2013. (Year: 2013).*

(Continued)

*Primary Examiner* — Christopher B Seibert
(74) *Attorney, Agent, or Firm* — Fitch, Even, Tabin & Flannery LLP

(57) ABSTRACT

In some embodiments, apparatuses and methods are provided herein useful to recommending products to a customer based on derived subjective attributes for the products. In some embodiments, a system for recommending products to a customer comprises a customer prompt module configured to receive an indication of a category, determine, based on derived subjective attributes of the customer, an initial set of products, select a prompt based on an estimated number of products in the initial set of products that can be eliminated, incorporate, with a script, the prompt, present the prompt, receive the response to the prompt, a scoring module configured to calculate a score for the response to the prompt, a product recommendation module configured to eliminate at least a portion of the initial set of products, determine that a threshold has been reached, and a presentation module configured to generate a GUI including the remaining products.

20 Claims, 6 Drawing Sheets

(56) References Cited

U.S. PATENT DOCUMENTS

| | | | |
|---|---|---|---|
| 7,987,188 B2* | 7/2011 | Neylon | G06F 16/313 |
| | | | 707/739 |
| 8,386,336 B1* | 2/2013 | Fox | G06Q 30/0253 |
| | | | 705/26.1 |
| 8,417,713 B1* | 4/2013 | Blair-Goldensohn | |
| | | | G06F 16/335 |
| | | | 707/751 |
| 8,666,844 B2 | 3/2014 | Shaya | |
| 9,773,270 B2 | 9/2017 | Costa | |
| 9,836,511 B2 | 12/2017 | Gur | |
| 2001/0021914 A1* | 9/2001 | Jacobi | G06Q 30/0253 |
| | | | 705/14.53 |
| 2005/0159962 A1 | 7/2005 | Weiss | |
| 2009/0110089 A1* | 4/2009 | Green | H04L 5/0037 |
| | | | 375/260 |
| 2010/0268661 A1* | 10/2010 | Levy | G06Q 30/02 |
| | | | 705/347 |
| 2013/0246174 A1 | 9/2013 | Davidson | |
| 2013/0332305 A1 | 12/2013 | Palmer | |
| 2014/0195931 A1* | 7/2014 | Kwon | G06Q 30/02 |
| | | | 715/753 |
| 2014/0304106 A1 | 10/2014 | Dahan | |
| 2014/0351079 A1* | 11/2014 | Dong | G06Q 30/0631 |
| | | | 705/26.7 |
| 2015/0066706 A1 | 3/2015 | Wang | |
| 2016/0132954 A1 | 5/2016 | Guckelsberger | |
| 2016/0292769 A1 | 10/2016 | Colson | |
| 2017/0193997 A1* | 7/2017 | Chen | G10L 17/22 |
| 2017/0236182 A1 | 8/2017 | Ignatyev | |

OTHER PUBLICATIONS

PCT; App. No. PCT/US2019/33667; International Search Report and Written Opinion dated Aug. 12, 2019.

PCT; App. No. PCT/US2019/33671; International Search Report and Written Opinion dated Aug. 12, 2019.

Salesforce; "Product Recommendation Engines to Improve Customer Relationships."; https://www.salesforce.com/solutions/industries/retail/resources/product-recommendation-engines/#; pp. 1-6.

Sohail, Shahab Saquib; "Product Recommendation Techniques for Ecommerce—past, present and future"; International Journal of Advanced Research in Computer Engineering & Technology (IJARCET); vol. 1, Issue 9; Nov. 2012; pp. 219-225.

* cited by examiner

SYSTEMS AND METHODS FOR PRODUCT RECOMMENDATION

CROSS-REFERENCE TO RELATED APPLICATION

This application claims the benefit of U.S. Provisional Application No. 62/677,924, filed May 30, 2018, which is incorporated by reference in its entirety herein.

TECHNICAL FIELD

This invention relates generally to shopping services, and, more particularly, product recommendations.

BACKGROUND

Many retailers are attempting to predict what products customers will like and recommend these products for the customers. Such recommendations can increase sales, and in some cases profits, for retailers. Many of these systems rely on data about customers, such as purchase history and browsing history. While a customer's purchase history and browsing history are useful in predicting what products the customer may like, using only these metrics can result in a large number of products being recommended to the customer or products being recommended to the customer that the customer does not like or already owns. For example, if a customer recently purchased a blue shirt and the system recommends every blue shirt that a retailer carries to the customer, this likely large number of blue shirt recommendations will not be helpful to the customer and may even decrease the likelihood of a sale. As an example of providing irrelevant recommendations, if the customer recently purchased a grill and the system recommends additional grills, the recommendations may not be helpful or wanted, since it is unlikely that the customer will purchase a second grill in such a short time period. Consequently, a need exists for product recommendation systems, methods, and apparatuses that better recommend products to customers.

BRIEF DESCRIPTION OF THE DRAWINGS

Disclosed herein are embodiments of systems, apparatuses and methods pertaining to recommending products to a customer based on derived subjective attributes for the products. This description includes drawings, wherein.

Figure 1:
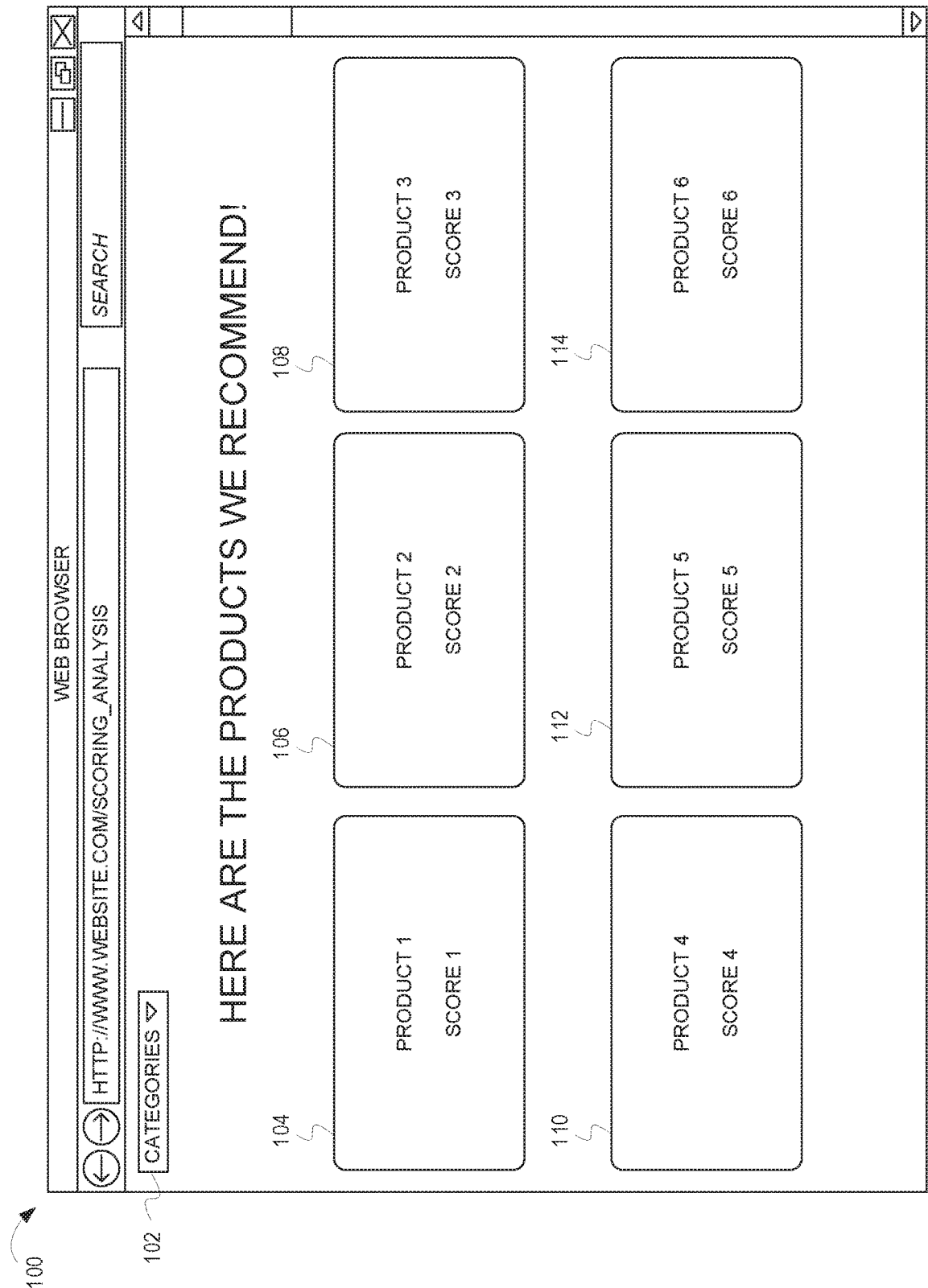
FIG. 1 depicts a graphical user interface (GUI) 100 presenting recommended products and scores for the recommended products, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to recommending products to a customer based on derived subjective attributes for the products. In some embodiments, a system for recommending products to a customer based on derived subjective attributes for the products comprises a customer prompt module, the customer prompt module configured to receive, from the customer, an indication of a category for which the customer is looking for a product, determine, based on derived subjective attributes of the customer, an initial set of products, wherein each product in the initial set of products belongs to a category, select, based on derived subjective attributes of each product in the initial set of products, a prompt, wherein the prompt is selected based on an estimated number of products in the initial set of products that can be eliminated based on a response to the prompt, and wherein the prompt is related to a specific subjective attribute of the category, incorporate, with a script, the prompt, present, to the customer, the prompt incorporated with the script, receive, from the customer, the response to the prompt, a scoring module, wherein the scoring module is configured to calculate, based on the response to the prompt, a score for the response to the prompt, wherein the score for the response to the prompt indicates a sentiment of the customer toward the specific subjective attribute of the category, a product recommendation module, the product recommendation module configured to eliminate, based on the score for the response to the prompt, at least a portion of the initial set of products, wherein remaining products comprise a refined set of products, determine, based on a number of products in the refined set of products, that a threshold has been reached, and a presentation module, the presentation module configured to generate, for presentation via a display device, a graphical user interface (GUI), wherein the GUI includes the remaining products.

As previously discussed, many retailers recommend products to customers in an attempt to better serve customers and increase sales. Many of these current systems rely on objective information about a product and/or a customer to make such recommendations. Typically, these current systems rely on a customer's purchase and/or browsing history and objective data for products to make product recommendations. For example, if a customer has a history of buying size medium shirts (objective data for the customer) and a shirt that the retailer offers for sale is a size medium (objective data for the product), the retailer may recommend the shirt to the customer simply because the customer has purchased size medium shirts in the past and the retailer offers other size medium shirts (i.e., based on the objective data of the customer and the objective data for products). While the retailer's recommendation may be useful to the customer, it fails to consider the reasoning behind the customer's purchase. That is, the system fails to consider subjective attributes of the customer and subjective attributes of the potential shirts.

In some embodiments, the systems, methods, and apparatuses described herein derive subjective attributes for the customer and derive subjective attributes for the products. For example, a subjective attribute for the customer may be that the customer enjoys participating in outdoor activities and a subjective attribute for a product may be that it is well-suited for outdoor activities. Based on the derivation of these subjective attributes, a product recommendation system can make a better recommendation for the customer.

Consider the example of a customer that has in the past purchased size medium shirts. If the system has derived that the customer enjoys participating in outdoor activities, the system can recommend only size medium shirts that are well-suited for outdoor activities (i.e., products having a subjective attribute that is the same or similar to a subjective attribute of the customer). Additionally, in some embodiments, the product recommendation system could recommend products other than shirts that are well-suited for outdoor activities, such as shoes, pants, sporting goods, water bottles, etc.

Figure 2:
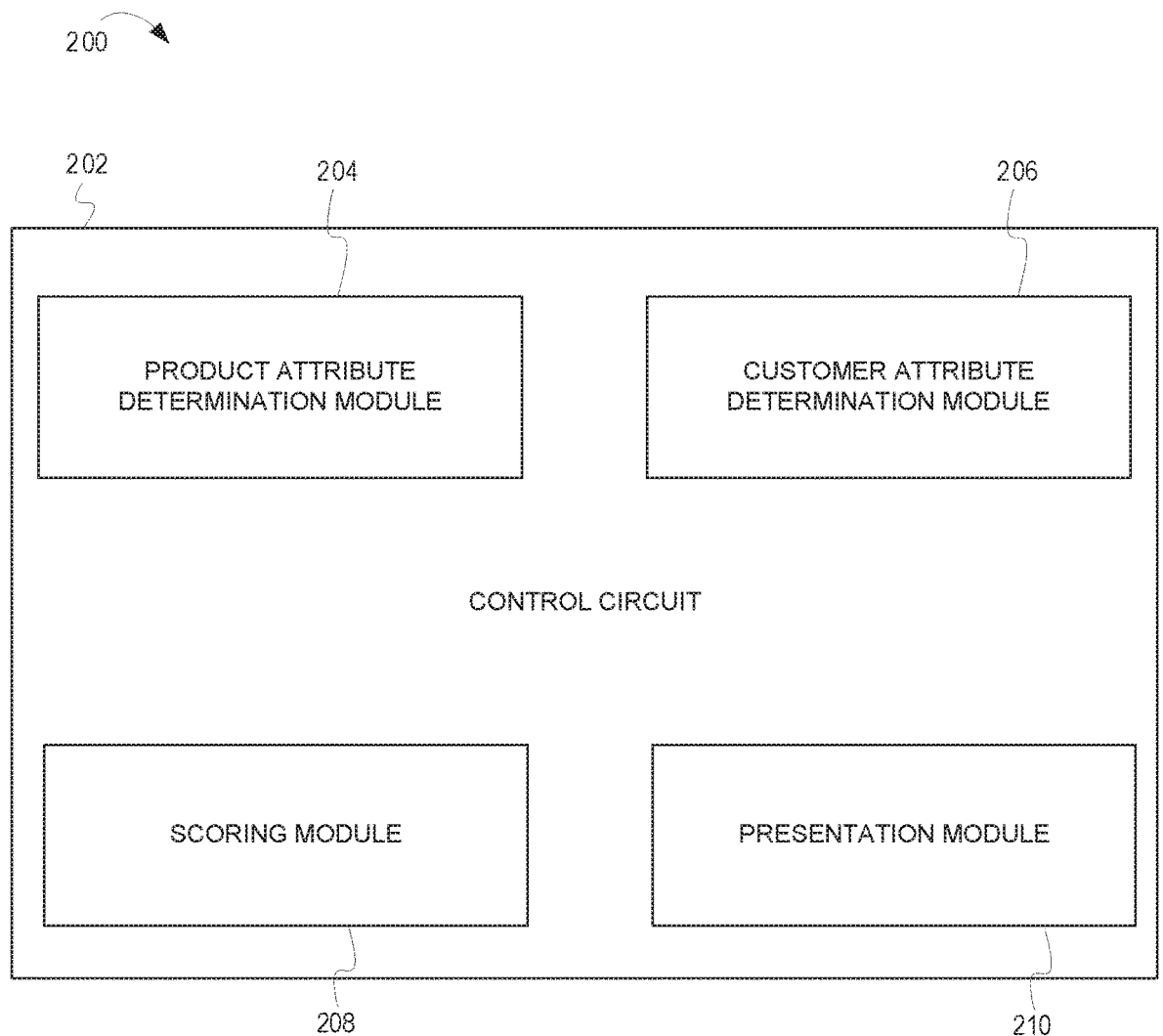
FIG. 2 is a block diagram of a system 200 for scoring products for a customer based on derived subjective attributes for products and derived subjective attributes for customers, according to some embodiments.
Figure 3:
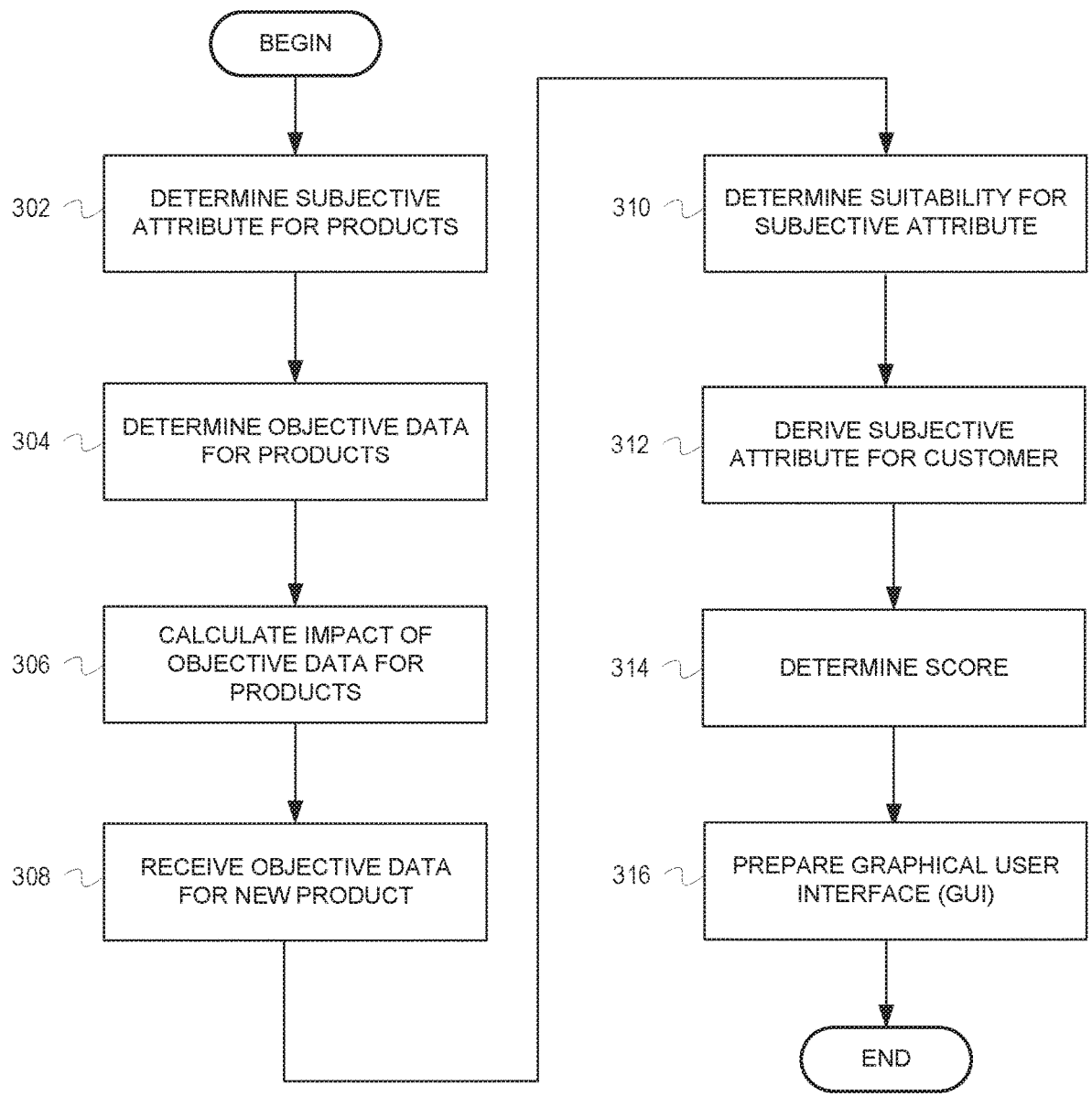
FIG. 3 is a flow chart depicting example operations for scoring products for a customer based on derived subjective attributes for products and derived subjective attributes for customers, according to some embodiments.

In some embodiments, the systems, methods, and apparatuses described herein derive subjective attributes based on known objective data. That is, subjective attributes for customers can be derived from objective data about the customers and subjective attributes for products can be derived from objective data about the products. Typically, objective data is data that is verifiable and not subject to opinion. For example, objective data for products can include color, weight, dimensions, the inclusion or lack of a feature, etc. Similarly, objective data for customers can include, for example, demographic information about customers, ages of customers, genders of customers, physical locations of customers, information about customer residences, observable customer behavior, purchase history, etc. The product recommendation system can leverage this objective data to derive subjective attributes for customers and products, and make product recommendations based on the derived subjective attributes. The discussion of FIG. 1 provides an overview of presenting such recommended products. The discussion of FIGS. 2-3 provide additional information regarding the derivation of subjective attributes and scoring of products.

Figure 4:
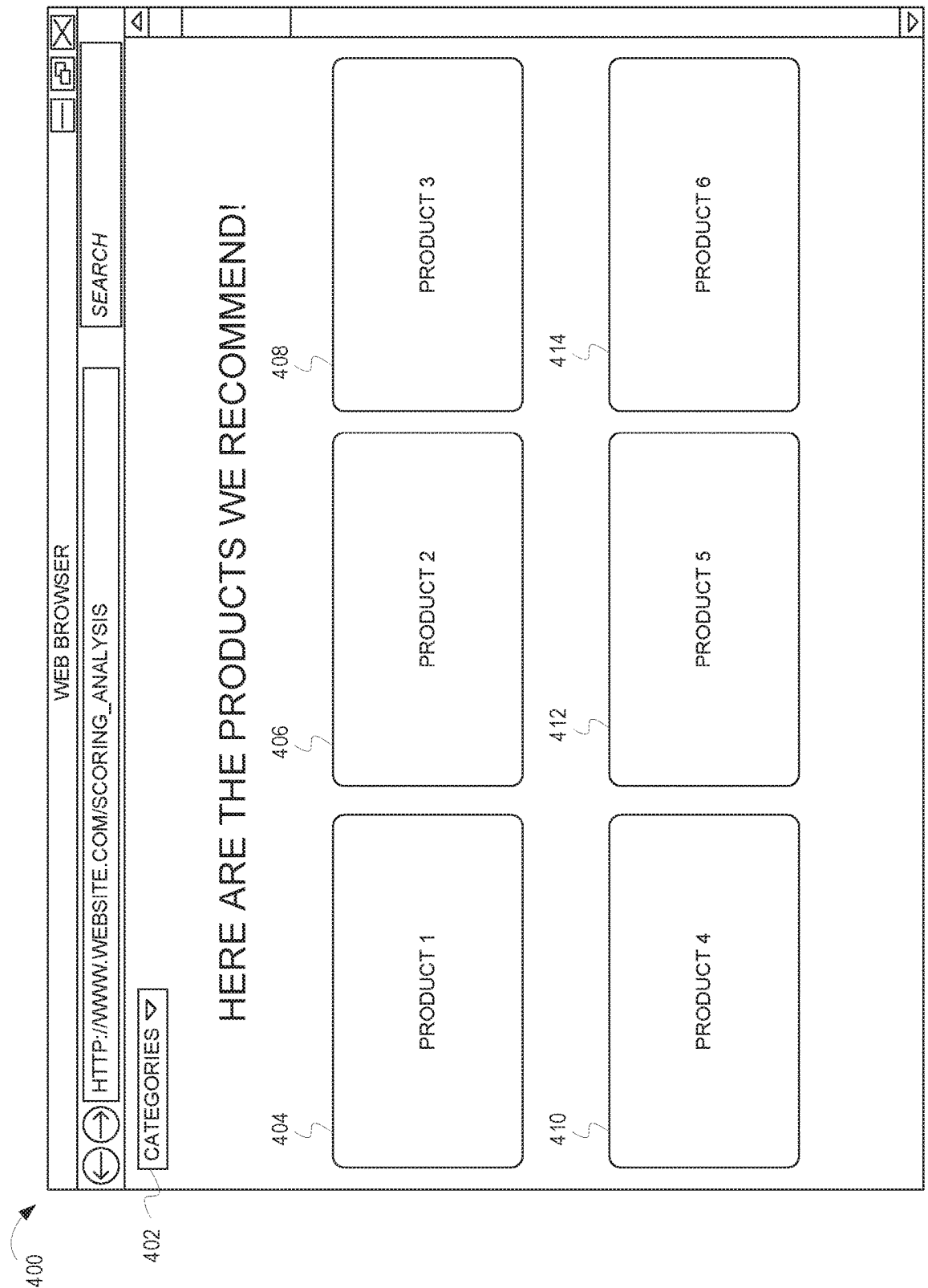
FIG. 4 depicts a graphical user interface (GUI) 400 presenting recommended products, according to some embodiments.
Figure 5:
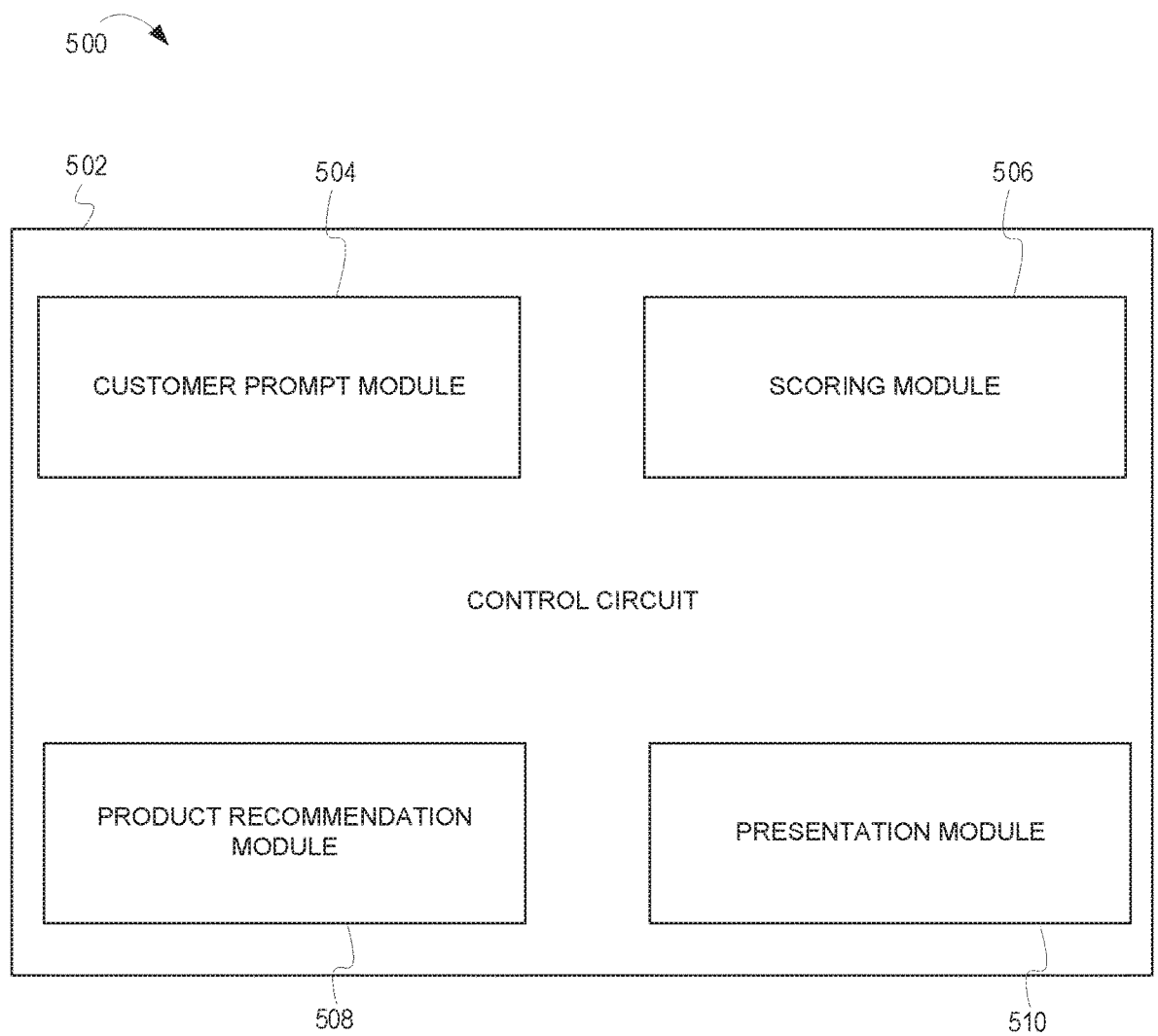
FIG. 5 is a block diagram of a system 500 for recommending products to a customer based on derived subjective attributes for the products according to some embodiments.
Figure 6:
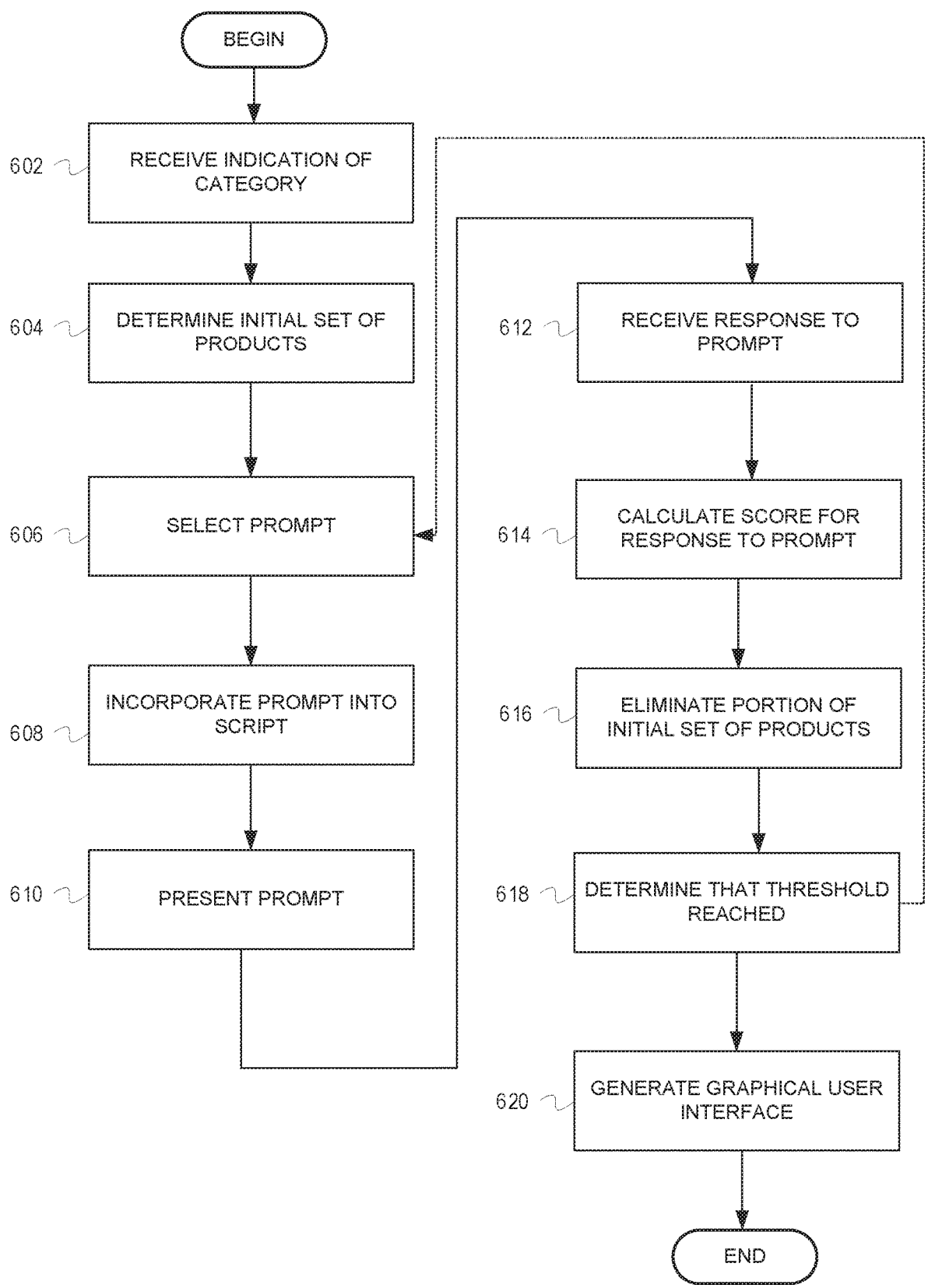
FIG. 6 is a flow chart depicting example operations for recommending products to a customer based on derived subjective attributes of the products, according to some embodiments.

Additionally, in some embodiments, the systems, methods, and apparatuses described herein can perform a question and answer (i.e., prompt-response) process to help further decrease the number of products that are recommended to the customer. For example, after an initial set of products has been selected for recommendation to the customer, the initial set of products can be further narrowed based on a customer's answer to one or more prompts. Continuing the example described above, if a customer typically purchases size medium shirts and it has been derived that the customer enjoys participating in outdoor activities, the initial set of products may include a number of shirts (and possibly products from other categories) that are well-suited for participating in outdoor activities. After the initial set of products is recommended, the system can select prompts to present to the customer. The prompts can take any form suitable to receiving a response from the customer (e.g., questions, statements, selections, etc.). The prompts are associated with subjective attributes. For example, the medium-shirt-buying customer who enjoys participating in outdoor activities may be prompted with a question such as "do you often participate in outdoor activities when it is hot out?" If the customer answers "yes" to this question, the system can eliminate those shirts that, while they may be-well suited for participating in outdoor activities, are not well-suited for participating in outdoor activities in a warm climate. In some embodiments, this prompt-response process continues until a threshold has been reached (e.g., the number of remaining products is below a certain value). In such embodiments, once the threshold is reached, the recommended products are presented to the customer. The discussion of FIG. 4 provides an overview of presenting such recommended products. The discussion of FIGS. 5-6 provide additional information regarding the elimination of potential products based on a prompt-response process.

FIG. 1 depicts a graphical user interface (GUI) 100 presenting recommended products and scores for the recommended products, according to some embodiments. As depicted in FIG. 1, the GUI 100 is being presented via a browser, such as a web browser. Although FIG. 1 depicts the GUI 100 as being presented via a browser, such an implantation is not required. For example, the GUI 100 can be presented via an application on a mobile device, on a kiosk, etc. Additionally, the product recommendation system can operate as a thick client or a thin client system.

The GUI 100 includes six recommended products: a first product 104, a second product 106, a third product 108, a fourth product 110, a fifth product 112, and a sixth product 114. Each of the six products is being recommended based on derived subjective attributes of the product and derived subjective attributes for the customer (discussed in more detail with respect to FIGS. 2-3). Additionally, the GUI 100 includes a score for each of the products. The score indicates the relevancy of the product for the customer, based on the subjective attribute for the customer and the subjective attributes for the products.

It should be noted, that in some embodiments, the system may only recommend certain products. That is, the system can avoid recommending products that may be seen as creating a privacy concern. For example, the system may not recommend products that may reveal health conditions, religious affiliations, or any other consideration that may be deemed sensitive. In such embodiments, the system can store products, product categories, etc. that should not be included in recommendations.

In some embodiments, the GUI 100 also includes user-selectable options, such as a drop-down menu 102. The drop-down menu 102 allows the user to select options regarding what products are presented, how products are presented, what types of products are presented, etc. Although FIG. 1 depicts a drop-down menu 102 as the user-selectable option, other types of user-selectable options are possible, such as buttons, scroll bars, text entry fields, etc.

While the discussion of FIG. 1 provides an overview of a presentation mechanism for products recommended for a customer, the discussion of FIG. 2 provides additional detail regarding the derivation of subjective attributes and scoring of products.

FIG. 2 is a block diagram of a system 200 for scoring products for a customer based on derived subjective attributes for products and derived subjective attributes for customers, according to some embodiments. The system 200 includes a product attribute determination module 204, a customer attribute determination module 206, a scoring module 208, and a presentation module 210. In some embodiments, as depicted in FIG. 2, each of the modules can be incorporated with a control circuit 202. Alternatively, some or all of the modules may be separate hardware and/or software pieces. For example, one or more of the modules can include a control circuit, memory, etc.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

Each module performs specific tasks for the system 200 to score products for a customer based on derived subjective attributes for products and derived subjective attributes for the customer. The product attribute determination module 204 performs tasks associated with determining objective data for products and deriving subjective attributes for the products. Specifically, the product attribute determination module 204 calculates the impact of objective attributes for products on a subjective attribute for products and uses the information determine whether a new product is able to satisfy the subjective attribute.

In some embodiments, the product attribute determination module 204 receives data related to a subjective attribute for products. For example, the product attribute determination module 204 can receive user reviews, question and answers sections (e.g., on a website), and/or professional product reviews. In some embodiments, the attribute determination module 204 collects the reviews from a website. The data allude to or indicate a subjective attribute for the products. For example, based on user reviews, the product attribute determination module 204 may determine that Stroller A and Stroller B are well-suited for travelling and the Stroller C and Stroller D are not well-suited for travelling. That is, multiple user reviews for both Stroller A and Stroller B may state that Stroller A and Stroller B are good for travelling, and multiple user reviews may state for both Stroller C and Stroller D may state that Stroller C and Stroller D are not good for travelling. In this example, "good for travelling" would be the subjective attribute for the products (i.e., strollers).

With the determination as to which products satisfy a subjective attribute, the product attribute determination module 204 determines what objective data causes a product to be well-suited or not-well suited for the subjective attribute. That is, the product attribute determination module 204 determines the impact of objective data on subjective attributes for products. Additionally, in some embodiments, a product's suitability for a subjective attribute is not binary (i.e., a product is not required to either be well-suited or not well-suited for a subjective attribute). In such embodiments, a product's suitability for a subjective attribute can range along a scale. In either case, the product attribute determination module 204 calculates the impact of objective data on the subjective attribute. Continuing the example discussed above, when analyzing the objective data for the strollers, the product attribute determination module 204 may determine that both Stroller A and Stroller B have a weight below a certain value, are foldable, and have dimensions below a certain value. Additionally, the product attribute determination module 204 may determine that both Stroller C and Stroller D have a weight above a certain value, are not foldable, and have dimensions above a certain value. In this example, the product attribute determination module 204 can conclude that these objective data (i.e., weight, foldability, and size) all impact the subjective attribute of being "good for travelling." While this simple example only includes four strollers, in practice, the product attribute determination module 204 is capable of, and may, analyze a significantly larger number of products (e.g., tens, hundreds, or even thousands of products). With a large pool of products to analyze, the product attribute determination module 204 can make more specific determinations as to the impact that the objective data have on the subjective attribute. For example, based on a larger pool of products, the product attribute determination module 204 may conclude that weight and foldability are more important for the subjective attribute "good for travel" than size. Accordingly, while size impacts the subjective attribute "good for travel," it does so to a lesser degree than that of weight and foldability. Further, the product attribute determination module 204 can determine that once a threshold is reached, the exact value for the objective data is irrelevant. For example, if the overall dimensions for a stroller must be L×W×H to be able to fit in a storage compartment on an airplane, any stroller with overall dimensions less than L×W×H will satisfy this criterion and that the amount that a specific stroller's dimensions are less than L×W×H doesn't have an significant impact on the subjective attribute "good for travel." Further, in some embodiments, multiple pieces of objective data can impact a subjective attribute. For example, if a stroller has dimensions greater than L×W×H, but the stroller folds, it may still be well-suited for travel. That is, although the stroller is larger than what is preferred for travel, its ability to fold may overcome, or negate, its large size. In this example, the overall dimensions of the stroller and its inclusion or lack of a folding feature may both need to be considered with regard to stroller size when determining whether the stroller is well-suited for travel. In such embodiments, these analyses can be thought of as if, else, and/or else-if statements. For example, if a stroller has overall dimensions under L×W×H and does not fold, or if a stroller does not have overall dimensions under L×W×H but is foldable and its folded dimensions are less than L×W×H, it is well-suite for travel, otherwise it is not well-suited for travel.

Once the product attribute determination module 204 determines what objective data, and to what degree the objective data, impact the suitability of a product to a subjective attribute, the product attribute determination module 204 can evaluate a new product to determine to what degree the new product satisfies the subjective attribute. The new product is a product for which suitability for a subjective attribute is not known. For example, the new product may be a product that the retailer has just begun selling, or a product for which the suitability for the subjective attribute is unknown (i.e., no data is possessed regarding the suitability of the product for the subjective attribute). The product attribute determination module 204 determines to what degree the new product satisfies the subjective attribute based on objective data for the new product. Continuing the example above, the product attribute determination module can determine to what degree a new stroller (i.e., Stroller E) satisfies the subjective attribute "good for travel." If the objective data for Stroller E indicates that Stroller E has a weight below a certain value and is foldable, the product attribute determination module 204 can conclude that Stroller E satisfies the subjective attribute "good for travel." However, although Stroller E may have a weight below a certain value and be foldable, Stroller E may not have dimensions below a certain value. While Stroller E has a weight below a certain value and is foldable, it may not be the best stroller for travelling because the dimensions of Stroller E are above a certain value. In this case, the degree to which Stroller E satisfies the subjective attribute "good for travel" may be lower than that of Stroller A and/or Stroller B.

The customer attribute determination module 206 is responsible for making determinations regarding a customer's subjective attributes. In some embodiments, this determination is performed in a similar manner to that of the product attribute determination module's 204 determination of subjective attributes for products. The customer attribute determination module 206 may consider objective data for multiple customers when determining a subjective attribute for a specific customer. For example, returning to the example provided above, the customer attribute determination module 206 can determine that the specific customer travels frequently and therefore would likely prefer a stroller that is good for travelling. This determination can be based on objective data for the specific customer, as well as objective data for other customers. For example, if it is known that customers who like to travel are associated with certain objective data (e.g., purchase history that includes travel-related products, social media posts discussing travel, travel itineraries in a calendar, etc.), if the specific customer also has similar objective data, it can be determined that the customer travels frequently or enjoys travelling. Additionally, in some embodiments, it may be known explicitly that a group of customers enjoy travelling. In such embodiments, the customer attribute determination module can consider the objective data for the group of customers that are known to enjoy travel when deriving a subjective attribute for the specific customer. Further, in some embodiments, the customer attribute determination module 206 can receive the objective data for multiple customers via a survey.

The scoring module 208 calculates scores for the products. The scores for the products are based on the subjective attributes for the product and the subjective attributes for the customer. Each score indicates how desirable the product would be for the specific customer. Calculating the scores for the product can be performed in any suitable manner. As a simple example, products can be scored on a binary basis (e.g., the subjective attribute of the customer is "travels frequently" and the product either satisfies the subjective attribute "good for travel" or fails to satisfy the subjective attribute "good for travel"). However, in some embodiments, the scoring can be more complex. For example, the scoring can be based on an algorithm in which the degree to which the product satisfies the subjective attribute and the importance of the subjective attribute to the customer are considered when calculating the scores. As one example, the scoring module 208 can determine values for the products' subjective attribute and the specific customer's subjective attribute ranging between −1 and 1, where −1 represents a strong aversion between the customer and the subjective attribute of the product and a 1 represents a strong attraction, with values in between representing some value of aversion or attraction. Further, the objective data for the product can be represented as values between 0 and 1, where 0 indicates the absence of a trait and 1 indicates the presence of a trait, with values in between representing some level of the trait, where appropriate (e.g., a stroller weighing less than 5 kilograms may be ideal and receive a 1, a stroller weighing 7 kilograms may be adequate and receive a 0.4, and a stroller weighing 12 kilograms may not satisfy the subjective attribute "good for travel" and receive a 0). In this example, the scoring module 208 can calculate the scores by multiplying the value for the subjective attribute for the customer and the value for the objective data for the product. In the case where multiple objective data impact the subjective attribute for the product, the scoring module 208 can perform this calculation for each of the objective data and average the values for each to calculate a score for the product. In this manner, scores for each of a number of products can be calculated with respect to the specific customer. Additionally, in some embodiments, the system can "reuse" the scores for future insights (i.e., with other customers and/or other products). For example, the system may detect patterns in the attraction and/or aversion relationship between customers and products. The system can leverage these patterns across customer and/or product types to make future recommendations.

The presentation module 210 is responsible for preparing the products and scores for display. In some embodiments, the product display module 210 prepares the products for display by generating a graphical user interface (GUI) that includes the products. The products presented are the products recommended to the specific customer. The GUI also includes an indication of a score for each product. The indication of the score for each product provides an easy way for the specific customer to determine how relevant each product may be for him or her. In some embodiments, the presentation module 210 prepares all of the possible products, for example in a category, for presentation. Alternatively, the presentation module 210 may only present some of the products. For example, the presentation module 210 may only present products having a score over a threshold.

While the discussion of FIG. 2 describes an example system for scoring products based on derived subjective attributes for products and derived subjective attributes for customers, the discussion of FIG. 3 provides example operations for scoring products based on derived subjective attributes for products and derived subjective attributes for customers.

FIG. 3 is a flow chart depicting example operations for scoring products for a customer based on derived subjective attributes for products and derived subjective attributes for customers, according to some embodiments. The flow begins at block 302.

At block 302, subjective attributes for products are determined. For example, a product attribute determination module can determine the subjective attributes for the products. These subjective attributes for products are determined based on reviews of products (e.g., user reviews, question and answer sections, professional product reviews, live customer interactions, user research, etc.). The goal of this subjective attribute determination for products is to calculate the impact of objective data for the products on the subjective attribute for the products. For example, if, based on the reviews, a bike is well-suited for beginner riders (e.g., product reviews for the bike state that the bike is well-suited for beginner riders), the product attribute determination module will determine that the bike is well-suited for beginner riders. The product attribute determination module determines the subjective attribute for a number of products, such as products belonging to the same category. In the example provided above, the product attribute determination module can determine subjective attributes for a number of bikes (e.g., the suitability of a number of bikes for beginner riders based on the reviews). In some embodiments, the category can be broader or narrower than bikes generally. For example, the category could include all transportation means (e.g., bikes, skateboards, scooters, etc.) or include only a subset of bikes (e.g., bikes intended for children, bikes under a certain size, etc.). The flow continues at block 304.

At block 304, objective data for the products are determined. For example, the product attribute determination module can determine the objective data for the products. Objective data is data that is verifiable and not subject to opinion. For example, objective data for products can include color, weight, dimensions, the inclusion or lack of a feature, etc. The product attribute determination module can determine the objective data for the products based on manufacturer specifications, objective data listed on a website (e.g., another retailer's website or a manufacturer's website), information provided by a seller (e.g., a third party seller that wants to sell a product via the retailer), observed behaviors and trends, and in house calculations (e.g., measurements and observations performed by the retailer). Typically, the product attribute determination module will attempt to the determine the objective data for the products for which the subjective attribute has been determined. Continuing the example above, the product attribute determination module would determine objective data for each of the bikes for which the subjective attribute was able to be determined. If the subjective attribute for the products is the suitability of a bike for beginner riders, the objective data may include the weight of the bike, the size of the bike, whether the bike includes training wheels, the width of the tires, etc. Ultimately, the product attribute determination module will use the determined objective data and the determined subjective attribute to determine in what way the objective data impacts the suitability of the product (e.g., the bike) for the subjective attribute (e.g., good for beginner riders). The flow continues at block 306.

At block 306, an impact of the objective data for the products on the subjective attribute for the products is calculated. For example, the product attribute determination module can calculate the impact of the objective data for the products on the subjective attribute of the products. Each piece of objective datum may impact the subjective attribute differently, or not at all. Continuing the example provided above, the presence of training wheels on a bike may impact the suitability of a bike for beginner riders more significantly than the color of the bike, as training wheels will likely be useful for beginner riders to learn to ride a bike and the color of the bike will not likely alter the performance of the bike for beginner riders. In embodiments in which the product attribute determination module determines subjective attributes for multiple products and objective data for multiple products, the product attribute module may be able to thoroughly analyze what objective data makes a product suitable for different subjective attributes. Additionally, in some embodiments, the impact of objective data on the suitability of products for subjective attributes can be extended beyond the category of products. For example, if the product attribute determination module determines that the size of a bike has a large impact on the suitability of the bike for beginner riders, the product attribute determination module may also be able to determine that the size of other products (e.g., sporting equipment, apparel, etc.) impacts the suitability of the products for beginner riders, such as children. The flow continues at block 308.

At block 308, objective data for a new product is received. For example, the product attribute determination module can receive the objective data for the new product. The new product is a product for which the suitability for the subjective attribute is to be determined. For example, the new product may be a product for which no information regarding the subjective attribute exists (e.g., a product for which no or few reviews indicate the suitability for the subjective attribute, a product that has recently been introduced, etc.). Ideally, the received objective data for the new product will have at least some overlap with the objective data determined for the products by the product attribute determination module. Continuing the example provided previously, if the new product is a new bike, the objective data for the new bike may include the weight of the new bike, the size of the new bike, whether the new bike includes training wheels, the width of the tires, etc. The flow continues at block 310.

At block 310, the to what degree the new product satisfies the subjective attribute is determined. For example, the product attribute determination module can determine to what degree the new product satisfies the subjective attribute (i.e., the product attribute determination module can derive subjective attributes for the new product). In some embodiments, the product attribute determination module determines to what degree the new product satisfies the subjective attribute based on the received objective data for the new product. That is, the product attribute determination module leverages the links, correlations, and/or reasoning gleaned regarding the impact of the objective data on the subjective attribute to determine the suitability of the new product for the subjective attribute. Continuing the previously provided example, if the new bike does not include training wheels but is lightweight and of a size appropriate for beginner riders, the product attribute determination module may determine that the new bike would be appropriate for beginner riders. In some embodiments, this determination is more granular than a product simply being suited for subjective attribute (i.e., the degree to which the new product satisfies the subjective attribute may be more than that the new product either is, or is not, well-suited for the subjective attribute). Continuing the example provided above, although the new bike is lightweight and of a size appropriate for beginner riders, it does not have training wheels. The lack of training wheels may make the new bike less suitable for beginner riders than a second bike that is lightweight, is of a size appropriate for beginner riders, and includes training wheels (i.e., the degree to which the new bike satisfies the subjective attribute is lower than that of the second bike). The flow continues at block 312.

At block 312, a subjective attribute for a specific customer is derived. For example, a customer attribute determination module can derive the subjective attribute for the specific customer. Much like the product attribute determination module derives subjective attributes for new products, the customer attribute determination module can derive subjective attributes for a specific customer based on known information. In the case of the subjective attributes for a specific customer, the customer attribute determination module derives the subjective attributes of the specific customer based on known information about other customers. For example, if all customers in a group share a subjective attribute, the customer attribute determination module can leverage objective data for the customers in the group to determine an impact of the objective data on the subjective attribute of the customers in the group. Continuing the example provided above, the customer attribute determination module may determine that the child of the customer shopping for the bike is risk averse. This determination can be based on any suitable information regarding other customers. For example, customers in the group of customers may have children that are of a similar age and buy products that include significant safety features (objective data for the customers). This objective data may indicate that the customers in the group are risk averse and/or their children are risk averse. The flow continues at block 314.

At block 314, a score is calculated for products. For example, a scoring module can calculate the score for the products. The scores indicate the relevancy of the products for the specific customer, based on the subjective attribute for the customer and the subjective attributes for the products. That is, the score is indicative of how desirable a product would be for the specific customer. Returning to the example provided above, the scoring module can calculate scores for each of the potential bikes. The score for each bike would indicate its relevancy to the specific customer. For example, if the customer is looking for a bike that is suitable for beginner riders for his or her risk averse child, the score will indicate how relevant each bike may be to the customer (i.e., the desirability of each bike for the specific customer). The scores can be based on any suitable scale (e.g., a discrete or continuance numeric value, a range of statements (e.g., excellent, good, moderate, poor, etc.), etc.). Additionally, the products for which scores are calculated can vary based on the embodiment. Continuing the example above, scores for all bikes can be calculated, or only scores for a subset of bikes (e.g., bikes of suitable size for children, only bikes that have training wheels, only bikes meeting a certain weight criterion, etc.). The flow continues at block 316.

At block 316, a graphical user interface (GUI) is prepared. For example, a presentation module can prepare the GUI for presentation. The GUI includes the products and scores for the products. In some embodiments, the GUI includes all products (e.g., all products in a category, products across several (possibly related categories), etc.). In other embodiments, the GUI includes only some of the products. For example, the GUI may include only products having a score above a certain value, only products in specific categories, only products in specific price ranges, etc.). The presentation module prepares the GUI for presentation via a display device (e.g., a CRT/LCD/LED/etc. display device for a computer, mobile device, television, etc.).

While the discussion of FIGS. 1-3 describe scoring products for a customer based on derived subjective attributes for products and derived subjective attributes for customers, the discussion of FIGS. 4-6 describe recommending products to a customer based on derived subjective attributes for the products.

FIG. 4 depicts a graphical user interface (GUI) 400 presenting recommended products, according to some embodiments. As depicted in FIG. 4, the GUI 400 is being presented via a browser, such as a web browser. Although FIG. 4 depicts the GUI 400 as being presented via a browser, such an implantation is not required. For example, the GUI 400 can be presented via an application on a mobile device, on a kiosk, etc. Additionally, the product recommendation system can operate as a thick client or a thin client system.

The GUI 400 includes six recommended products: a first product 404, a second product 406, a third product 408, a fourth product 410, a fifth product 412, and a sixth product 414. Each of the six products is being recommended based on the elimination of products based on a prompt-response process (discussed in more detail with respect to FIGS. 5-6). The system begins with an initial set of products and eliminates at least some of the products based on the prompt-response process. In some embodiments, the products of the initial set of products are selected based on derived subjective attributes of the products and derived subjective attributes for the customer (an example of which is discussed in detail with respect to FIGS. 1-3.).

In some embodiments, the GUI 400 also includes user-selectable options, such as a drop-down menu 402. The drop-down menu 402 allows the user to select options regarding what products are presented, how products are presented, what types of products are presented, etc. Although FIG. 4 depicts a drop-down menu 402 as the user-selectable option, other types of user-selectable options are possible, such as buttons, scroll bars, text entry fields, etc.

While the discussion of FIG. 4 provides an overview of a presentation mechanism for products recommended for a customer, the discussion of FIG. 5 provides additional detail regarding the elimination of potential products (i.e., the products in the initial set of products) based on a prompt-response process.

FIG. 5 is a block diagram of a system 500 for recommending products to a customer based on derived subjective attributes for the products according to some embodiments. The system 500 includes a customer prompt module 504, a scoring module 506, a product recommendation module 508, and a presentation module 510. In some embodiments, as depicted in FIG. 5, each of the modules can be incorporated with a control circuit 502. Alternatively, some or all of the modules may be separate hardware and/or software pieces. For example, one or more of the modules can include a control circuit, memory, etc. In some embodiments, the modules depicted in FIG. 5 can be incorporated with the same control circuit 202 depicted in FIG. 2.

The control circuit 502 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 502 operably couples to a memory. The memory may be integral to the control circuit 502 or can be physically discrete (in whole or in part) from the control circuit 502 as desired. This memory can also be local with respect to the control circuit 502 (where, for example, both share a common circuit board, chassis, power supply, and/or housing) or can be partially or wholly remote with respect to the control circuit 502 (where, for example, the memory is physically located in another facility, metropolitan area, or even country as compared to the control circuit 502).

This memory can serve, for example, to non-transitorily store the computer instructions that, when executed by the control circuit 502, cause the control circuit 502 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

Each module performs specific tasks for the system 500 to generate a group of products that are presented to the customer. The customer prompt module 504 is responsible for selecting and presenting prompts to the customer. The customer prompt module 504 receives an indication of a category for which the customer is looking for a product. The category can be broad or narrow, dependent upon the embodiment. For example, a narrow category may be "white dress shirts," while a broad category may be "children's gifts." The customer prompt module 504 determines an initial set of products. The customer prompt module 504 determines the initial set of products based on derived subjective attributes of the customer. In some embodiments, the initial set of products includes those products selected based on derived subjective attributes of the customer and derived subjective attributes of the products (e.g., as described with respect to FIGS. 1-3). In such embodiments, the customer prompt module 504 may be incorporated with, or replaced by, one or more of the modules depicted in FIG. 2.

After populating the initial set of products, the customer prompt module 504 selects a prompt. In some embodiments, each prompt is related to a specific subjective attribute for the products (e.g. a subjective attribute of the category). For example, the prompt "do you frequently exercise outdoors?" could be related to a subjective attribute associated with whether, and possibly to what degree, the customer enjoys participating in outdoor activities. The customer prompt module selects a prompt based on an estimated number of products in the initial set of products that can be eliminated. For example, if the initial set of products includes shoes, roughly half of which are not well-suited for outdoor activities, the customer's response to the prompt "do you frequently exercise outdoors?" may eliminate all of the shoes that are not well-suited for outdoor activities. The prompts can allow for any response (e.g., "what is your favorite activity?"), or include a set of prepopulated responses ("please pick your favorite activity from the following list: Activity A, Activity, B, Activity C"). Additionally, in some embodiments, the prompts can be designed to elicit a specific response or type of response (e.g. the prompt "do you like to jog?" may be designed to elicit a "yes" or "no" response from the customer).

The customer prompt module 504 incorporates the prompt with a script. For example, the script may be a larger, conversational pattern. In some embodiments, the script, and the prompt, include modular segments. In such embodiments, the prompts can be incorporated with the script by incorporating the modular segments. After incorporating the prompt with the script, the customer prompt module 504 presents the prompt to the customer (i.e., presents the prompt incorporated with the script to the customer). The customer response to the prompt and the customer prompt module 504 receives the response to the prompt.

The scoring module 506 is responsible for analyzing the customer's response and determining a score for the customer's response. After receiving the response to the prompt, the scoring module 506 calculates a score for the response. The score indicates the customer's sentiment toward the subjective attribute with which the prompt is related. Continuing the example provided above, the customer's response to the prompt "do you frequently exercise outdoors?" would allow the scoring module 506 to calculate a score indicating the customer's sentiment toward participating in outdoor activities. The score can be binary (e.g., the customer does or does not enjoy participating in outdoor activities) or on a scale (e.g., to what degree the customer enjoys participating in outdoor activities). As one example, in the case of a non-binary sentiment, the score can range on a scale from −1 to 1, where −1 would represent a strong negative sentiment toward a subjective attribute and a 1 would represent a strong positive sentiment toward a subjective attribute. Any suitable scale can be used (e.g., a 1-10 scale, 0-100 scale, etc.).

The product recommendation module 508 is responsible for narrowing the initial set of products to a refined set of products. The product recommendation module 508 eliminates at least some of the products in the initial set of products. Although the product recommendation module 508 will typically eliminate at least one product in the initial set of products, in some embodiments, the response to the prompt may not allow the product recommendation module 508 to eliminate any products. For example, if the customer responds in a manner such that no information can be gained (e.g., the customer responds that he or she does not know or does not have a preference), the product recommendation module 508 may not eliminate any products from the initial set of products. The product recommendation module 508 eliminates these products based on the score calculated by the scoring module 506 (and therefore the sentiment of the customer toward the subjective attribute with which the prompt is related). For example, if the sentiment of the response is that the customer does enjoys participating in outdoor activities, the product recommendation module can eliminate all of the products in the initial set of products that are not well-suited for participating in outdoor activities. In some embodiments, this elimination is based on derived subjective attributes of the products, the derivation of which is described in detail with respect to FIGS. 1-3. In embodiments in which the sentiment of the customer's response is binary, the customer prompt module 504 eliminates products on a binary basis (i.e., whether or the product is well-suited for the subjective attribute). In embodiments in which the sentiment of the customer's response is not binary, the product recommendation module 508 performs a deeper analysis regarding the sentiment of the customer's response and the subjective attribute of the product. For example, if the customer's response indicates that the customer exercises outdoors "sometimes" and the score is based on a scale from −1 to 1, the sentiment of the customer toward the subjective attribute "enjoys participating in outdoor activities" may be a 0.3. In this example, the product recommendation may be able to eliminate products not only the products in the initial set of products that are not well-suited for outdoor activities, but may also eliminate some of the products that are extremely well-suited for outdoor activities based on other considerations. For example, if a pair of shoes is extremely well-suited for outdoor activities but also quite expensive, the product recommendation module 508 can eliminate this pair of shoes if the customer is averse to expensive shoes (i.e., the sentiment of the customer to the subjective attribute "enjoys participating in outdoor activities" is not high enough to warrant the inclusion of pair of shoes that may be very well-suited for outdoor activities and are quite expensive). Put simply, the customer the customer's relatively low enjoyment in participating in outdoor activities does not overcome the high cost of the pair of shoes.

The result of this elimination is a refined set of products (e.g., a set of products including those of the initial set of products, or a previous set of products, that have not been eliminated). In some embodiments, the prompt-response, and elimination, processes continues until a threshold is reached. The threshold can be related to a number of products, a number of prompts presented to the customer, subjective attributes of the products, and/or subjective attributes of the customer. For example, the threshold may be reached when a number of products in the refined set of products is below a certain number, after a maximum number of prompts have been presented to the customer, and/or the available information does not allow any further prompts to be presented.

The presentation module 510 is responsible for preparing the products for presentation to the customer. In some embodiments, the presentation module 510 prepares the products for display by generating a graphical user interface (GUI) that includes the products. The products presented are the products recommended for the customer.

In some embodiments, the customers' responses and/or scores for the responses can be stored. In such embodiments, the customers' responses and/or scores for the responses can be used in future recommendations. For example, a customer's score with regard to a response can be used for future recommendations for that customer and/or other customers.

While the discussion of FIG. 5 provides additional detail regarding the elimination of potential products (i.e., the products in the initial set of products) based on a prompt-response process, the discussion of FIG. 6 provides example operations for recommending products to a customer based on derived subjective attributes of the products.

FIG. 6 is a flow chart depicting example operations for recommending products to a customer based on derived subjective attributes of the products, according to some embodiments. The flow begins at block 602.

At block 602, an indication of a category is received. For example, a customer prompt module can receive the indication of the category. In some embodiments, the indication of the category is received from the customer. The indication of the category received from the customer can be explicit or implicit. For example, the customer may explicitly state that he or she wishes to purchase a dishwasher. Alternatively, the customer may imply that he or she wishes to purchase new clothing items (e.g., the indication received from the customer is that he or she is bored with the clothes he or she currently owns). Further, in some embodiments, an iterative process can be performed to determine the category. For example, a prompt-response process similar to that described above can be used to determine a category. In such embodiments, the customer is presented with prompts that are related to categories. The initial set of categories (e.g., all categories or a subset of the categories) is similar to the initial set of products. During the iterative process, categories of the initial set of categories can be eliminated based on responses received from the customers. In such embodiments, a similar prompt-response process can be performed to determine a category before the prompt-response process begins to narrow the initial set of products. In such embodiments, the receipt of the indication of the category would be receipt of the response to the prompts. The flow continues at block 604.

At block 604, an initial set of products is determined. For example, the customer prompt module can determine the initial set of products. The products included in the initial set of products belong to the category. In some embodiments, the initial set of products may be all products that the retailer offers that belong to the category. In other embodiments, the products included in the initial set of products can be based on filtering. For example, the customer prompt module can filter products based on the objective data for the products, objective data for the customer, subjective attributes for the products, and/or subjective attributes for the customer. In some embodiments, this filtering is performed based on derived subjective attributes of the products and/or derived subjective attributes of the customer, as discussed in detail with respect to FIGS. 1-3. The flow continues at block 606.

At block 606, a prompt is selected. For example, the customer prompt module can select the prompt. Each of the prompts are related to specific subjective attributes of the category. In this manner, prompts seek to elicit a response that will allow a scoring module to determine a customer's sentiment toward a specific subjective attribute. Additionally, in some embodiments, the customer prompt module selects prompts based on an estimated number of products from the initial, or previous in the case of further iterations, set of products that can be eliminated. For example, if 10% of the products in the initial set of products are well-suited for people who enjoy attending sporting events and 90% of the products in the initial set of products are not well-suited for people who enjoy attending sporting events, a customer's response to a prompt related to this subjective attribute may allow the system to eliminate 10% of the products if the customer has a strong dislike for attending sporting events or 90% of the products if the customer really enjoys attending sporting events. In some embodiments, the customer prompt module selects prompts based on a binary search algorithm. That is, the customer prompt module may select prompts that are likely to allow 50% of the products in the initial set of products to be eliminated. While some embodiments may allow utilization of a standard binary search algorithm, other embodiments may utilize a modified binary search algorithm or an algorithm that is similar to a binary search algorithm (i.e., the products which will be recommended can be determining in logarithmic time by attempting to eliminate half of the products in each iteration (e.g., $O(\log N)$). Further, in some embodiments, the customer prompt module can eliminate possible prompts for which the customer's response is already known. For example, if a prompt is related to the subjective attribute "enjoys to participate in outdoor activities" and based on the subjective attributes for the customer it is known that the customer enjoys participating in outdoor activities, the customer prompt module will eliminate this prompt. Further, in some embodiments, eliminated prompts can be used to refine which products are recommended for the customer. For example, because the customer's response is already known, the customer's known response can be used to filter the products for recommendation, even though the prompt was not presented to the customer. The flow continues at block 608.

At block 608, the prompt is incorporated into a script. For example, the customer prompt module can incorporate the prompt into the script. The script can be as detailed or limited as required by the specific embodiment. In some embodiments, the script can be very detailed and the prompts very brief. For example, the script may be "do you like" and the prompt could be any of a number of words to be placed at the end of the script (e.g., sports, movies, new foods, etc.). In some embodiments, the script is much more limited and the prompts more detailed. For example, the script may simply be an introduction to the prompt-response process, and the prompts make up most of the dialogue. In some embodiments, the script can be specific to a customer and/or cateogry. For example, the script can be detailed based on what is known about the customer and/or category. The flow continues at block 610.

At block 610, the prompt incorporated with the script is presented to the customer. For example, the customer prompt module can present the prompt incorporated with the script. The customer prompt module can present the prompts visually (e.g., as text, images, etc.) and/or audibly. The flow continues at block 612.

At block 612, a response to the prompt is received. For example, the customer prompt module can receive the response to the prompt. The response to the prompt is received from the customer. The customer prompt module can receive the prompt via any suitable type of customer input (e.g., verbal input, input selecting an item, textual input, etc.). The flow continues at block 614.

At block 614, a score is calculated for the response to the prompt. For example, the scoring module can calculate the response to the prompt. The score for the prompt indicates a sentiment of the customer toward the subjective attribute with which the prompt is related. The score can be binary (e.g., the customer does or does not enjoy participating in outdoor activities) or on a scale (e.g., to what degree the customer enjoys participating in outdoor activities). As one example, in the case of a non-binary sentiment, the score can range on a scale from −1 to 1, where −1 would represent a strong negative sentiment toward a subjective attribute and a 1 would represent a strong positive sentiment toward a subjective attribute. Any suitable scale can be used (e.g., a 1-10 scale, 0-100 scale, etc.). In some embodiments, the scoring module calculates the score for the response based on a sentiment algorithm (e.g., a valence aware dictionary and sentiment reasoner (VADER) algorithm). The flow continues at block 616.

At block 616, a portion of the initial set of products is eliminated. For example, a product recommendation module can eliminate the portion of the initial set of products. The product recommendation module eliminates the portion of the initial set of products based on the score for the response. For example, if the score for the response indicates that the customer prefers to cook his or her own meals, the product recommendation module can eliminate products that have the subjective attribute "not well-suited for frequent cooking." The elimination of products removes products from the initial set of products that do not satisfy the subjective attribute, or do not satisfy the subjective attribute thoroughly enough. In addition to eliminating products from the initial set of products, in embodiments, or instances, in which the prompt-response process is performed more than once, the product recommendation module eliminates products from the previous iteration of the prompt-response process. For example, at the second iteration, the product recommendation module eliminates products from the set of products that remain after the elimination of products from the initial set of products. The flow continues at block 618.

At block 618, it is determined that a threshold is reached. For example, the product recommendation module can determine that the threshold has been reached. In some embodiments, the threshold is reached when the number of products in the refined set of products is below the threshold. Additionally, or alternatively, the threshold can be related to a number of prompts presented to the customer, subjective attributes of the products, and/or subjective attributes of the customer. The threshold can be predetermined and/or variable based on any number of factors (e.g., the customer, subjective attributes of the customer, subjective attributes of the products, objective data for the customer, objective data for the products, a category of product, etc.). As previously discussed, in some embodiments or instances, the prompt-response process can proceed multiple times. In such embodiments, if the product recommendation module determines that the threshold has not been reached, the flow continues at block 606, as depicted by the dashed arrow. When this occurs, the prompt-response process begins again at block 606 and, in some embodiments, continues to repeat until the product recommendation module determines that the threshold has been reached. Once the product recommendation module determines that the threshold has been reached, the flow continues at block 620.

At block 620, a graphical user interface (GUI) is generated. For example, a presentation module can generate the GUI. In some embodiments, the presentation module prepares the products for display by generating a GUI that includes the products. The products presented are the products recommended for the customer. In some embodiments, the GUI can be interactive and/or include additional information, such as the information described with respect to FIG. 1.

In some embodiments, a system for recommending products to a customer based on derived subjective attributes for the products comprises a customer prompt module, the customer prompt module configured to receive, from the customer, an indication of a category for which the customer is looking for a product, determine, based on derived subjective attributes of the customer, an initial set of products, wherein each product in the initial set of products belongs to a category, select, based on derived subjective attributes of each product in the initial set of products, a prompt, wherein the prompt is selected based on an estimated number of products in the initial set of products that can be eliminated based on a response to the prompt, and wherein the prompt is related to a specific subjective attribute of the category, incorporate, with a script, the prompt, present, to the customer, the prompt incorporated with the script, receive, from the customer, the response to the prompt, a scoring module, wherein the scoring module is configured to calculate, based on the response to the prompt, a score for the response to the prompt, wherein the score for the response to the prompt indicates a sentiment of the customer toward the specific subjective attribute of the category, a product recommendation module, the product recommendation module configured to eliminate, based on the score for the response to the prompt, at least a portion of the initial set of products, wherein remaining products comprise a refined set of products, determine, based on a number of products in the refined set of products, that a threshold has been reached, and a presentation module, the presentation module configured to generate, for presentation via a display device, a graphical user interface (GUI), wherein the GUI includes the remaining products.

In some embodiments, an apparatus and a corresponding method performed by the apparatus comprises receiving, by a customer prompt module from the customer, an indication of a category for which the customer is looking for a product, determining, by the customer prompt module based on derived subjective attributes of the customer, an initial set of products, wherein each product in the initial set of products belongs to the category, selecting, by the customer prompt module based on derived subjective attributes of each product in the initial set of products, a prompt, wherein the prompt is selected based on an estimated number of products in the initial set of products that can be eliminated based on a response to the prompt, and wherein the prompt is related to a specific subjective attribute of the category, incorporating, by the customer prompt module with a script, the prompt, presenting, by the customer prompt module to the customer, the prompt incorporated with the script, receiving, by the customer prompt module from the customer, the response to the prompt, calculating, by a scoring module based on the response to the prompt, a score for the response to the prompt, wherein the score for the response to the prompt indicates a sentiment of the customer toward the specific subjective attribute of the category, eliminating, by a product recommendation module based on the score for the response to the prompt, at least a portion of the initial set of products, wherein remaining products comprise a refined set of products, determining, by the product recommendation module based on a number of products in the refined set of products, that a threshold has been reached, and generating, by a presentation module for presentation via a display device, a graphical user interface (GUI), wherein the GUI includes the remaining products.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for recommending products to a customer based on derived subjective attributes for the products, the system comprising:
   a customer prompt module, the customer prompt module configured to:
      receive, from the customer, an indication of a category for which the customer is looking for a product;
      determine, based on derived subjective attributes of the customer, an initial set of products, wherein each product in the initial set of products belongs to a category;
      select, based on derived subjective attributes of each product in the initial set of products, a prompt, wherein the prompt is selected based on an estimated number of products in the initial set of products that can be eliminated based on a response to the prompt, and wherein the prompt is related to a specific subjective attribute of the category;
      incorporate, with a script, the prompt;
      present, to the customer, the prompt incorporated with the script;
      receive, from the customer, the response to the prompt;
   a scoring module, wherein the scoring module is configured to:
      calculate, based on the response to the prompt, a score for the response to the prompt, wherein the score for the response to the prompt indicates a sentiment of the customer toward the specific subjective attribute of the category;
   a product recommendation module, the product recommendation module configured to:
      eliminate, based on the score for the response to the prompt, at least a portion of the initial set of products, wherein remaining products comprise a refined set of products;
      determine, based on a number of products in the refined set of products, that a threshold has been reached; and
   a presentation module, the presentation module configured to:
      generate, for presentation via a display device, a graphical user interface (GUI), wherein the GUI includes the remaining products.

2. The system of claim 1, wherein the scoring module is further configured to:
   determine, based on the derived subjective attributes of each product in the initial set of products and the derived subjective attributes for the customer, a score for each product in the initial set of products;
   wherein the product recommendation module is configured to eliminate at least one of the products in the initial set of products based on the score for each of the products in the initial set of products.

3. The system of claim 2, wherein the elimination of at least one of the products in the initial set of products based on the score for each of the products in the initial set of products occurs before the customer is presented with the prompt.

4. The system of claim 1, wherein the customer prompt module is further configured to:
   eliminate, based on the derived subjective attributes for the customer, at least one possible prompt, wherein upon elimination of the at least one possible prompt the at least one possible prompt will not be presented to the customer.

5. The system of claim 1, wherein the scoring module calculates the score for the response to the prompt based on a sentiment algorithm.

6. The system of claim 5, wherein the score for the response to the prompt ranges from −1 to 1.

7. The system of claim 1, wherein the customer prompt module selects the prompt based on a binary search algorithm.

8. The system of claim 1, wherein the customer prompt module presents the prompt to the customer audibly.

9. The system of claim 1, wherein the customer prompt module presents the prompt to the customer visually.

10. The system of claim 1, wherein the customer prompt module repeats selecting prompts and presenting the prompts until the threshold is reached.

11. A method for recommending products to a customer based on derived subjective attributes for the products, the method comprising:
- receiving, by a customer prompt module from the customer, an indication of a category for which the customer is looking for a product;
- determining, by the customer prompt module based on derived subjective attributes of the customer, an initial set of products, wherein each product in the initial set of products belongs to the category;
- selecting, by the customer prompt module based on derived subjective attributes of each product in the initial set of products, a prompt, wherein the prompt is selected based on an estimated number of products in the initial set of products that can be eliminated based on a response to the prompt, and wherein the prompt is related to a specific subjective attribute of the category;
- incorporating, by the customer prompt module with a script, the prompt;
- presenting, by the customer prompt module to the customer, the prompt incorporated with the script;
- receiving, by the customer prompt module from the customer, the response to the prompt;
- calculating, by a scoring module based on the response to the prompt, a score for the response to the prompt, wherein the score for the response to the prompt indicates a sentiment of the customer toward the specific subjective attribute of the category;
- eliminating, by a product recommendation module based on the score for the response to the prompt, at least a portion of the initial set of products, wherein remaining products comprise a refined set of products;
- determining, by the product recommendation module based on a number of products in the refined set of products, that a threshold has been reached; and
- generating, by a presentation module for presentation via a display device, a graphical user interface (GUI), wherein the GUI includes the remaining products.

12. The method of claim 11, further comprising:
- determining, by the scoring module based on the derived subjective attributes of each product in the initial set of products and the derived subjective attributes for the customer, a score for each product in the initial set of products;
- wherein the elimination of at least one of the products in the initial set of products is based on the score for each of the products in the initial set of products.

13. The method of claim 12, wherein the elimination of at least one of the products in the initial set of products based on the score for each of the products in the initial set of products occurs before the customer is presented with the prompt.

14. The method of claim 11, further comprising:
- eliminating, based on the derived subjective attributes for the customer, at least one possible prompt, wherein upon elimination of the at least one possible prompt the at least one possible prompt will not be presented to the customer.

15. The method of claim 11, wherein the calculating the score for the response to the prompt based on a sentiment algorithm.

16. The method of claim 15, wherein the score for the response to the prompt ranges from −1 to 1.

17. The method of claim 11, wherein selecting the prompt is based on a binary search algorithm.

18. The method of claim 11, wherein the prompt is presented audibly.

19. The method of claim 11, wherein the prompt is presented visually.

20. The method of claim 11, wherein the customer prompt module repeats selecting prompts and presenting the prompts until the threshold is reached.

* * * * *